United States Patent
Yerazunis et al.

(10) Patent No.: US 7,409,830 B2
(45) Date of Patent: Aug. 12, 2008

(54) FUEL-CELL ACTUATED MECHANICAL DEVICE

(75) Inventors: William S. Yerazunis, Acton, MA (US);
King Tong Lau, Bettystown (IE);
Roderick L. Shepherd, Dublin (IE)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 470 days.

(21) Appl. No.: 11/200,830

(22) Filed: Aug. 10, 2005

(65) Prior Publication Data
US 2007/0034523 A1  Feb. 15, 2007

(51) Int. Cl.
*F01K 25/06* (2006.01)
(52) U.S. Cl. ............... 60/649; 60/651; 60/671; 91/4 R
(58) Field of Classification Search ........... 60/649, 60/651, 671; 91/4 R, 4 A
See application file for complete search history.

(56) References Cited

U.S. PATENT DOCUMENTS

| | | | | |
|---|---|---|---|---|
| 3,911,284 A | * | 10/1975 | Skala | 290/16 |
| 6,446,597 B1 | * | 9/2002 | McAlister | 123/297 |
| 6,945,039 B2 | * | 9/2005 | Yoshino | 60/414 |
| 2002/0022165 A1 | * | 2/2002 | Brassard | 429/21 |
| 2003/0008192 A1 | * | 1/2003 | Freund et al. | 429/37 |

FOREIGN PATENT DOCUMENTS

EP  0082591  6/1983

OTHER PUBLICATIONS

Wei Gu, Xiaoyue Zhu, Nobuyuki Futai, Brenda S. Cho, and Shuichi Takayama, "Computerized microfluidic cell culture using elastomeric channels and Braille displays," Proceedings National Academy of Sciences of the United States of America, vol. 101(45), Nov. 9, 2004.
J. Liu et al., "Microfluidic Components for Chip-based Sample Preparation Systems," The 50th ASMS Annual Conference on Mass Spectrometry and Allied Topics, Orlando, Florida, Jun. 2002.

* cited by examiner

*Primary Examiner*—Hoang M Nguyen
(74) *Attorney, Agent, or Firm*—Dirk Brinkman; Clifton D. Mueller; Gene V. Vinokur

(57) ABSTRACT

A method generates mechanical energy by storing water in a fuel-cell and a pressure equalization device. The water stored in the fuel-cell is electrolyzed into hydrogen gas and oxygen gas, which displaces the water stored in the pressure equalization device. The displaced water is fed to a hydraulic device to drive the hydraulic device in a forward direction to produce mechanical energy.

23 Claims, 11 Drawing Sheets

100

200

300

400

500

800

FUEL-CELL ACTUATED MECHANICAL DEVICE

FIELD OF THE INVENTION

The invention relates generally to fuel-cells, and more particularly to reversible fuel-cells.

BACKGROUND OF THE INVENTION

Fuel-Cell

A fuel-cell reaction can be expressed as:

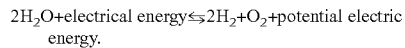

$2H_2O + \text{electrical energy} \leftrightarrows 2H_2 + O_2 + \text{potential electric energy}$.

A forward reaction of electrolysis consumes water ($H_2O$) and outgases hydrogen ($H_2$) and oxygen ($O_2$). A back reaction of hydrogen and oxygen produces water and potential electric energy, i.e., the so called 'fuel-cell' reaction.

FIG. 1 shows a typical prior art reversible fuel-cell 100. A direct current power supply 110 supplies current through wires 120 to electrodes 130 inside an electrolysis cell 140. The current electrolyzes water 150 in the electrolysis cell 140 to produce a mixture of gaseous hydrogen and oxygen 160 which flow through an interconnecting tube 170 to a reagent reservoir 180. This pressurizes a liquid reagent 190, forcing the reagent to flow out from the reservoir via a tube 195.

In the prior art, a catalytic recombination of the hydrogen and oxygen 160 is considered and permitted. However, that recombination is slow and uncontrolled. Additionally, the uncontrolled recombination of hydrogen and oxygen in that way generates heat, which is not usefully reclaimable.

FIG. 2 shows the structure of a prior art reversible fuel-cell system 200. The fuel-cell 203 includes a positive electrode 205, a positive porous conductor 206, a pervious proton exchange membrane 207, a negative porous conductor 208, and a negative electrode 209. For clarity, these parts are shown as exploded. However, to achieve good electrical conductivity, the structures 205, 206, 207, 208, and 209 are immediately adjacent.

The membrane can be prepared by methods such as described in U.S. Pat. Nos. 3,041,317; 3,282,875 and 3,624,053. One membrane is a sulfonated tetrafluoroethylene polymer membrane produced by E. I. DuPont de Nemours and Company, and is sold under the trademark 'Nafion'.

The polymer membrane 207 has the property that $H^+$ ions can diffuse through the membrane. For use in fuel-cells, both sides of the membrane are coated with a carbon powder. The particles in the carbon powder are coated with a film of platinum. The platinum catalyzes the $2H_2O \leftrightarrows 2H_2 + O_2$ reversible reaction. The carbon/platinum is in direct contact with a graphite-impregnated paper to provide a low-resistance electrical path, and the paper is highly porous to allow gas flow. The porous conducting layer is in turn contacted by perforated stainless-steel pressure plates, which are the actual mechanical electrode structures.

For electrolysis, the platinum catalyst on the carbon powder is decomposed due to energetic oxygen oxidizing the carbon powder. For this reason, cells that perform both electrolysis, that is, $2H_2O + \text{electrical energy} \rightarrow 2H_2 + O_2$, and fuel-cell reactions, that is, $2H_2 + O_2 \rightarrow 2H_2O + \text{potential electrical energy}$, use a specialized catalyst on the oxygen side. Usually, this catalyst is platinum and rhenium, or platinum on rhenium oxide. These catalysts are also used in direct-conversion methyl alcohol fuel-cells.

Additionally, the fuel-cell 203 includes two separated gas-tight compartments, a hydrogen compartment 210 and an oxygen compartment 211. The two compartments are separated by the membrane 207', also shown from the side. The membrane 207 keeps the hydrogen from mixing with the oxygen.

A direct current power supply 201 produces direct current. This current is switched by switch 202 to selectively supply current to a fuel-cell 203. Typically, the cell is initially filled with water. When the switch 202 is turned 'on', the current electrolyzes the water and produces hydrogen and oxygen.

After some quantity of hydrogen and oxygen are produced by the electrolysis, the switch 202 is turned 'off', and a load switch 204 is turned 'on' to supply current generated by the fuel-cell 203 to an energy recovering load 212. The presence of the load causes the hydrogen and oxygen to recombine. This current continues to be supplied to the load 212 as long as there is hydrogen and oxygen present in the cell.

When an external supply of hydrogen and oxygen is available, these gases can be supplied directly to the cell to generate electrical energy for the load 212 when load switch 204 is 'on'. The load 212 can be an energy recovering load. That is, a device that returns potential electric energy to the system power supply 201. For a battery-powered device, this can be accomplished by using a switching power supply to recharge the supply 201. For an AC-line powered device, a line-synchronized DC-to-AC inverter can be used to return the potential electric energy.

Micropump

Various types of micropumps are known. Micropumps can be classified as mechanical or non-mechanical. Mechanical micropumps include electromechanically driven piston pumps and thermo-pneumatically driven peristaltic pumps. Non-mechanical micropumps include electro-hydrodynamic micropumps and magneto-hydrodynamic micropumps.

One electrochemical micropump is described by S. M. Mitrovski and R. G. Nuzzo, "An electrochemically driven poly(dimethylsiloxane) microfluidic actuator: oxygen sensing and programmable flows and pH gradients," Lab on a Chip, Vol. 5, pp. 634-645, 2005. In this pump, oxygen and oxygen ions are used to 'drag' the fluid.

Other micropumps have been based on piezo effects in elastomer channels, Wei Gu, Xiaoyue Zhu, Nobuyuki Futai, Brenda S. Cho, and Shuichi Takayama describe one such system in "Computerized microfluidic cell culture using elastomeric channels and Braille displays," Proceedings National Academy of Sciences of the United States of America, vol. 101(45), Nov. 9, 2004. In that pump, piezo actuators are used to form a peristaltic pump, alternately squeezing and relaxing a thin elastic tube.

A chip-based electrolysis-driven micropump is described by J. Liu et al., "Microfluidic Components for Chip-based Sample Preparation Systems," The 50$^{th}$ ASMS Annual Conference on Mass Spectrometry and Allied Topics, Orlando, Fla., June, 2002. That micropump uses bubbles of hydrogen and oxygen to force reagents from the electrodes, which is electrolysis-based pumping. Clearly, that micropump is suitable only for reagents that are insensitive to hydrogen and oxygen. However, such reagents are rare, and that pump can only be used one time because there is no means to recombine the hydrogen and oxygen, nor any means to resupply the micropump with fluid.

It is desired to use electrolysis in a reversible fuel-cell as a mechanical energy generating device.

SUMMARY OF THE INVENTION

The process according to the invention generates mechanical energy by storing water in a fuel-cell and a pressure equalization device. The water stored in the fuel-cell is electrolyzed into hydrogen gas and oxygen gas, which displaces the water stored in the pressure equalization device. The displaced water is fed to a hydraulic device to drive the hydraulic device in a forward direction to produce mechanical energy.

DETAILED DESCRIPTION OF THE PREFERRED EMBODIMENTS OF THE INVENTION

System Structure

Figure 1:
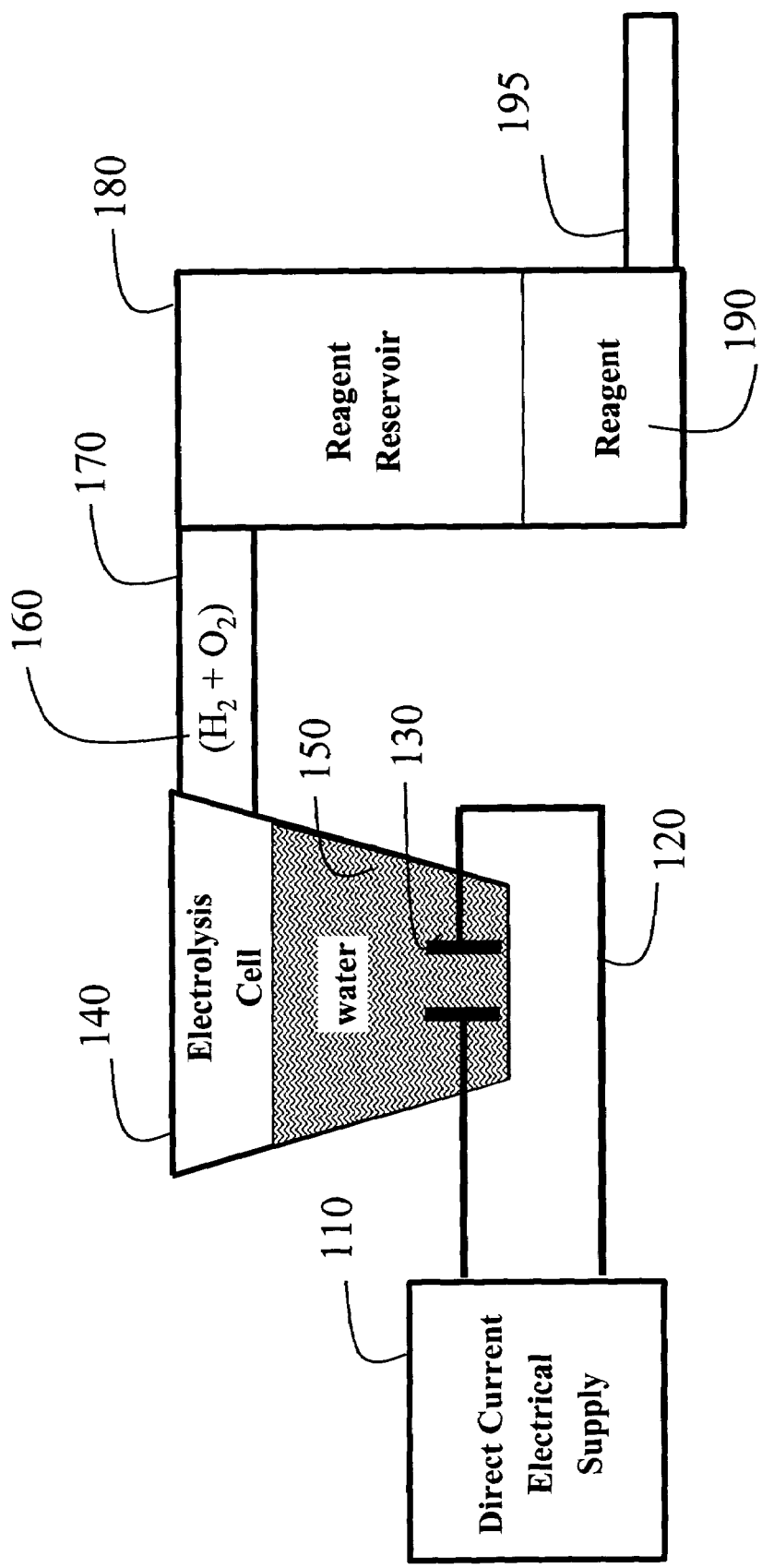
FIG. 1 is a block diagram of a prior art non-reversible fuel-cell.
Figure 2:
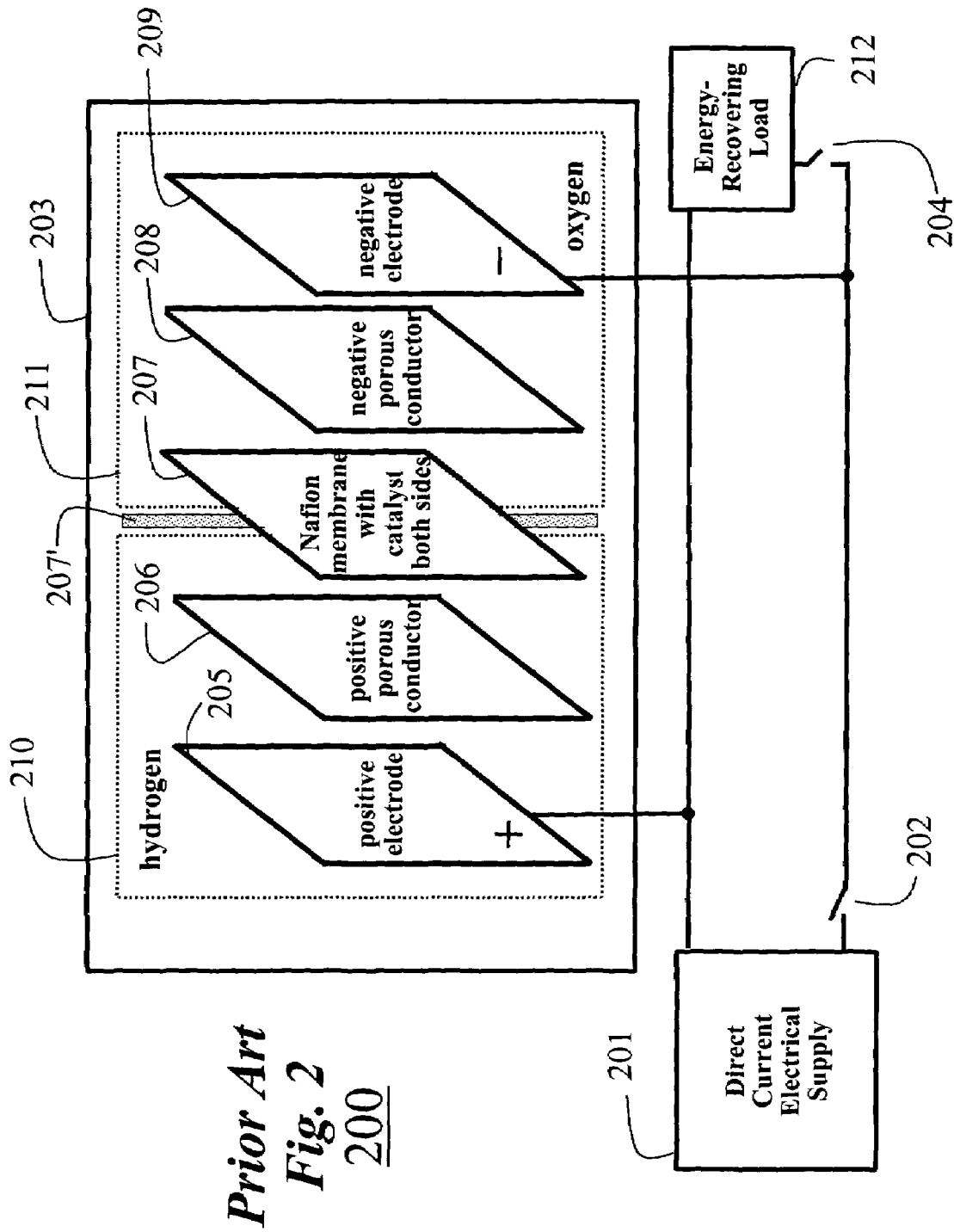
FIG. 2 is a block diagram of a prior art reversible fuel-cell.
Figure 3A:
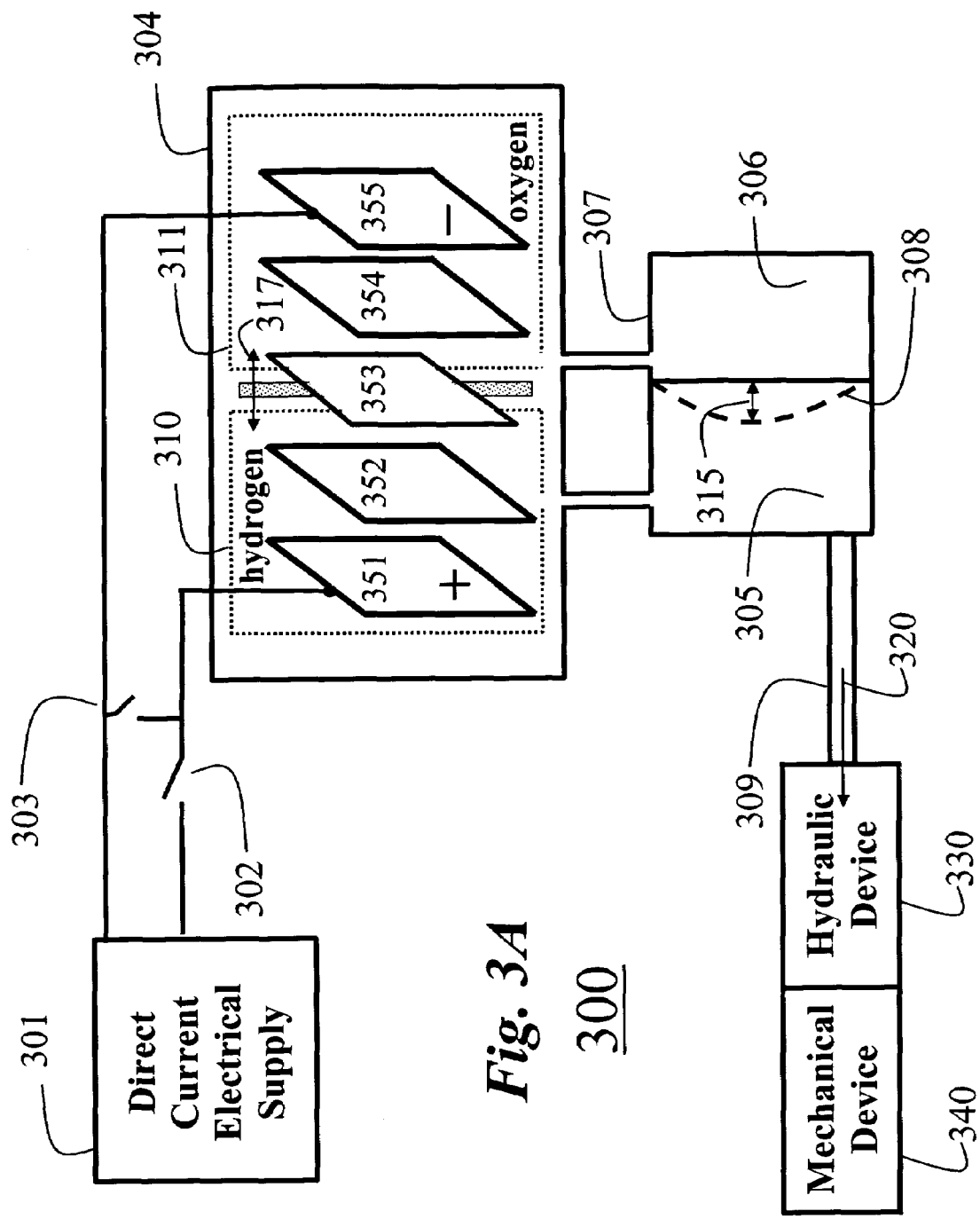
FIG. 3A is a block diagram of a reversible fuel-cell actuated mechanical energy generating device according to an embodiment of the invention.

FIG. 3A shows a fuel-cell actuated mechanical energy generating device 300 according to one embodiment of the invention. The device includes a fuel-cell 304 coupled to a pressure equalization device 307, which is coupled to a hydraulic device 330, which is optionally coupled to a mechanical device 340. As defined herein, the fuel-cell, pressure equalization device and hydraulic device form a 'closed' system for storing water. That is, during operation no water enters or exits the closed system.

The fuel-cell 304 includes a positive electrode 351, a positive porous conductor 352, a pervious proton exchange membrane 353, a negative porous conductor 354, and a negative electrode 355. The mechanical energy generating device 300 also includes a direct current power supply 301 connected serially to a pass switch 302, and in parallel to a shunt switch 303. The switches 302-303 enable the fuel-cell 304 to be powered electrically to cause electrolysis to generate hydrogen and oxygen according to the fuel-cell reaction

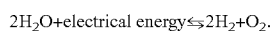

The hydrogen and oxygen are fed respectively to a hydrogen chamber 305 and oxygen chamber 306 of a pressure equalization device 307. The two chambers 305 and 306 are separated by a flexible, elastic, impervious diaphragm 308.

Initially, the fuel-cell 304 is filled with water. Any differential pressures occurring between the hydrogen and oxygen chambers are accommodated by motion 315 of diaphragm 308 so that the pressures between the hydrogen and oxygen compartments 310 and 311 remain substantially equal. The pressure equalization device 307 is designed so that any gases in the device are returned to the fuel-cell 304 when the fuel-cell is operated in a recombination mode.

Exiting from the pressure equalization device 307 is an actuator pressure delivery port 309. This port allows pressurized fluid 320 to exit from the actuator to drive a hydraulic device 330. Because the pressure equalization device balances pressures between the hydrogen and oxygen compartments of the fuel-cell 304, fluid motion through port 309 does not cause unsymmetrical pressure in the fuel-cell 304.

The pressurized fluid exiting through the port 309 is the mechanical energy output of the system. This fluid is a mixture of water and hydrogen. This mixture of water and hydrogen can be returned to the fuel-cell, first the hydrogen, and then the water, during the recombination mode. The hydraulic device 330 can be coupled to a mechanical device 340.

For one embodiment of the invention, the pervious membrane 353 can also move 317 to enable pressure equalization in the fuel-cell 304. In this case, the actuator pressure delivery port 309 can be connected directly to the hydrogen compartment 310 of the fuel-cell 304.

System Operation

Figure 3B:
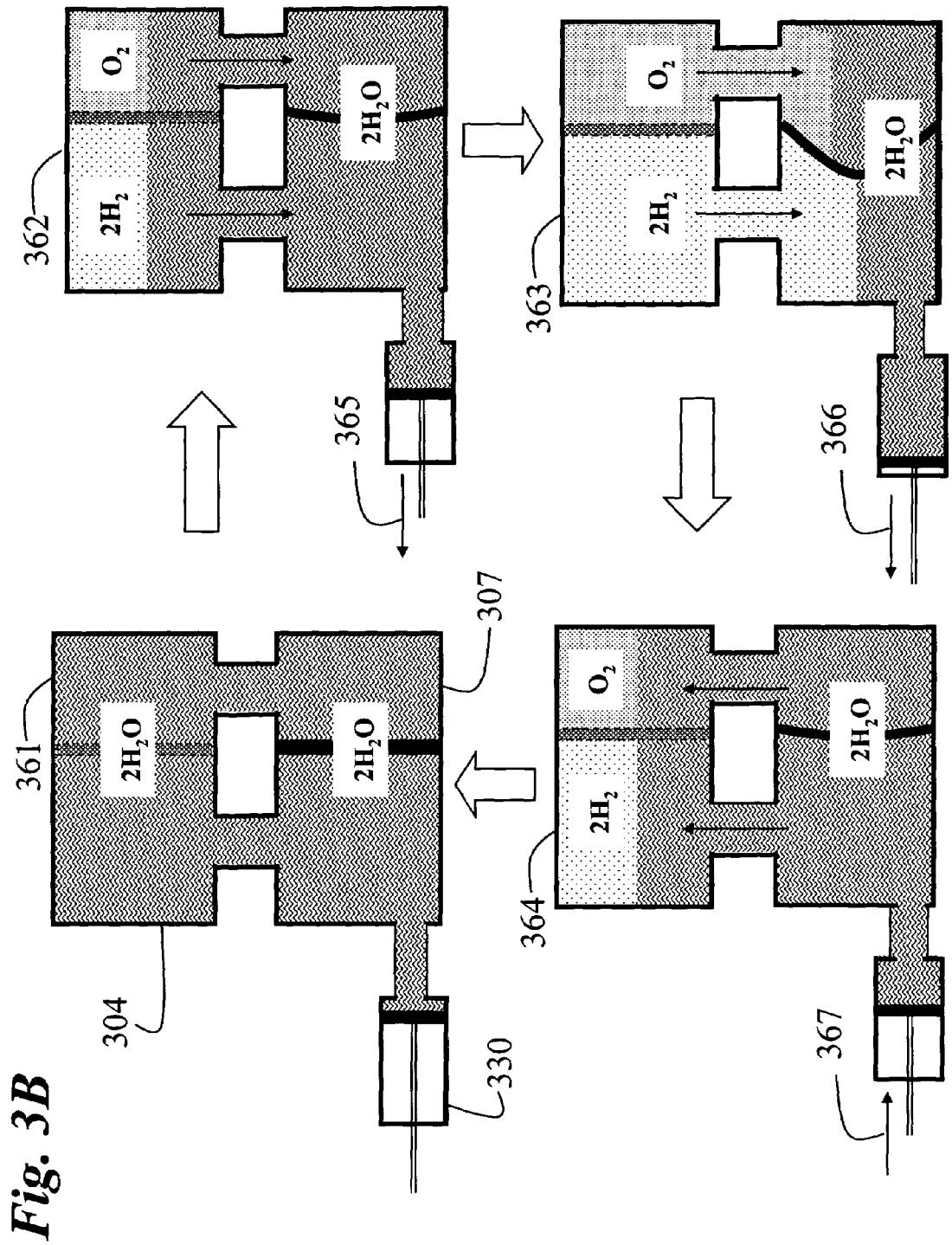
FIG. 3B is a flow diagram of the operation of a reversible fuel-cell actuated mechanical energy generating device according to an embodiment of the invention.

FIG. 3B shows the operation of the fuel-cell actuated mechanical energy generating device 300. During an initial state 361 the fuel-cell 304, the equalization device 307, and perhaps some part of the hydraulic device 330 are filled with water. During the electrolysis state 362, hydrogen and oxygen are produced to force pressurized water from the fuel-cell into the pressure equalizing device, and then into the hydraulic device to generate mechanical energy 365. As electrolysis proceeds during state 363, the gases may enter the equalization device, forcing more water into the hydraulic device for more energy 366.

During the recombination phase 364, a load is applied between the positive conductor 351 and the negative conductor 355. This load causes the hydrogen and oxygen to combine releasing electrons or potential electrical energy. Additional mechanical energy 367 is generated as the gases recombine, and the water is suctioned out of the hydraulic device and the equalization device back into the fuel-cell while the potential electric energy is generated according $2H_2+O_2 \rightarrow 2H_2O$+potential electric energy. The electrolyzing and recombining are repeated alternately to produce continuous mechanical energy.

Fuel-Cell Actuated Pump

Figure 4:
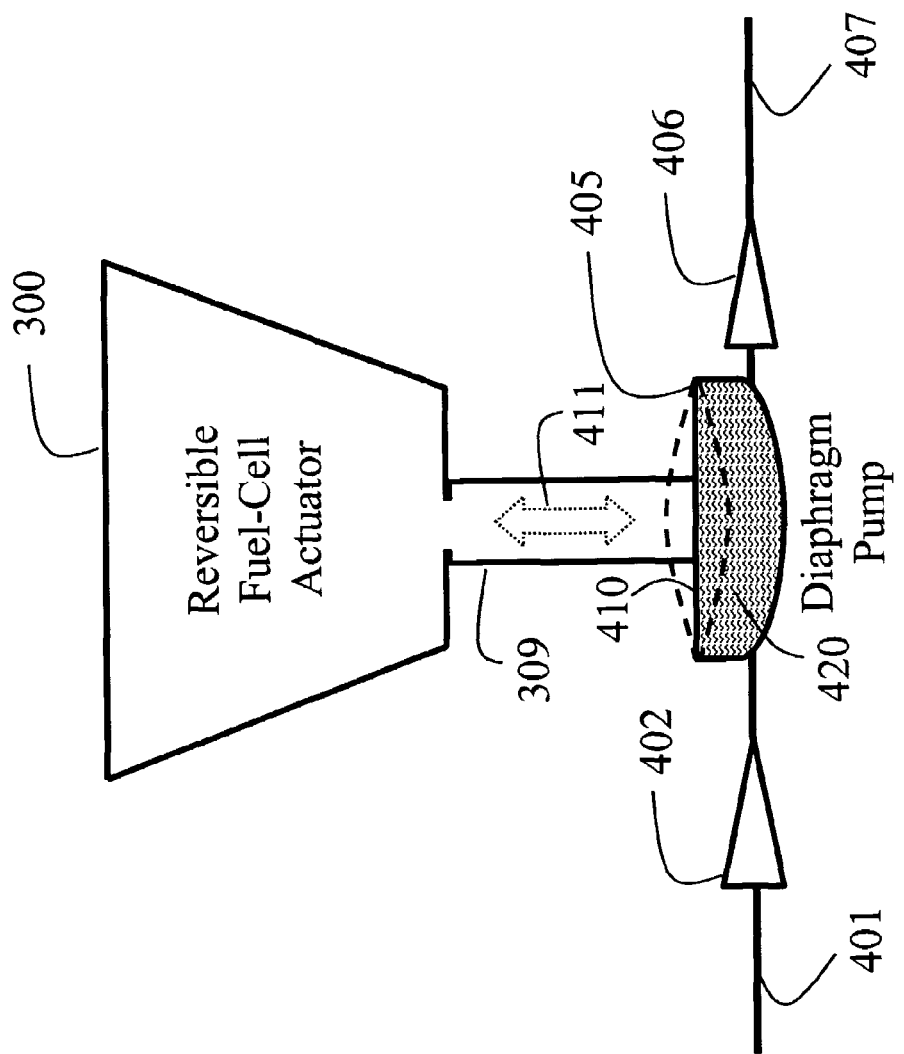
FIG. 4 is a block diagram of a reversible fuel-cell actuated pump with check valves according to an embodiment of the invention.

FIG. 4 shows a fuel-cell actuated pump 400 according to one embodiment of the invention. The pump includes the actuator 300 connected by the port 309 to a diaphragm pump 405. The diaphragm pump 405 includes an input tube 401, an input check valve 402, an output check valve 406, and an output tube 407.

A diaphragm 410 of the diaphragm pump 405 is alternatively driven downward and upward 411 by the pressurized fluid exiting the actuator pressure delivery port 309 from the reversible fuel-cell actuator 300. Initially, the diaphragm pump 405 is 'primed' with a fluid 420.

During operation, the reversible fuel-cell actuator 300 is first operated in electrolysis mode while supplied with current, generating hydrogen and oxygen. This increases pressure and fluid in the tube 309 drives the diaphragm 410 downward, forcing the fluid 420 to be pumped through the output check valve 406 and the output tube 407.

The reversible fuel-cell actuator 300 is then operated in fuel-cell mode, recombining the hydrogen and oxygen into water. The vacuum generated during this operation retracts the diaphragm 410 drawing additional fluid into the pump 405 via the input tube 401 and the input valve 402.

During the fuel-cell operation, the cell produces potential electrical energy, which may be reclaimed. This reclaimed electrical energy can be stored by any means in the prior art, as well as being directly used to operate another fuel-cell actuator, see FIGS. 5A-8. For example, the potential electric energy can be stored in a capacitor or the power supply 301 of the actuator 300.

Alternative Implementations of Fuel-Cell Actuator

Figure 5A:
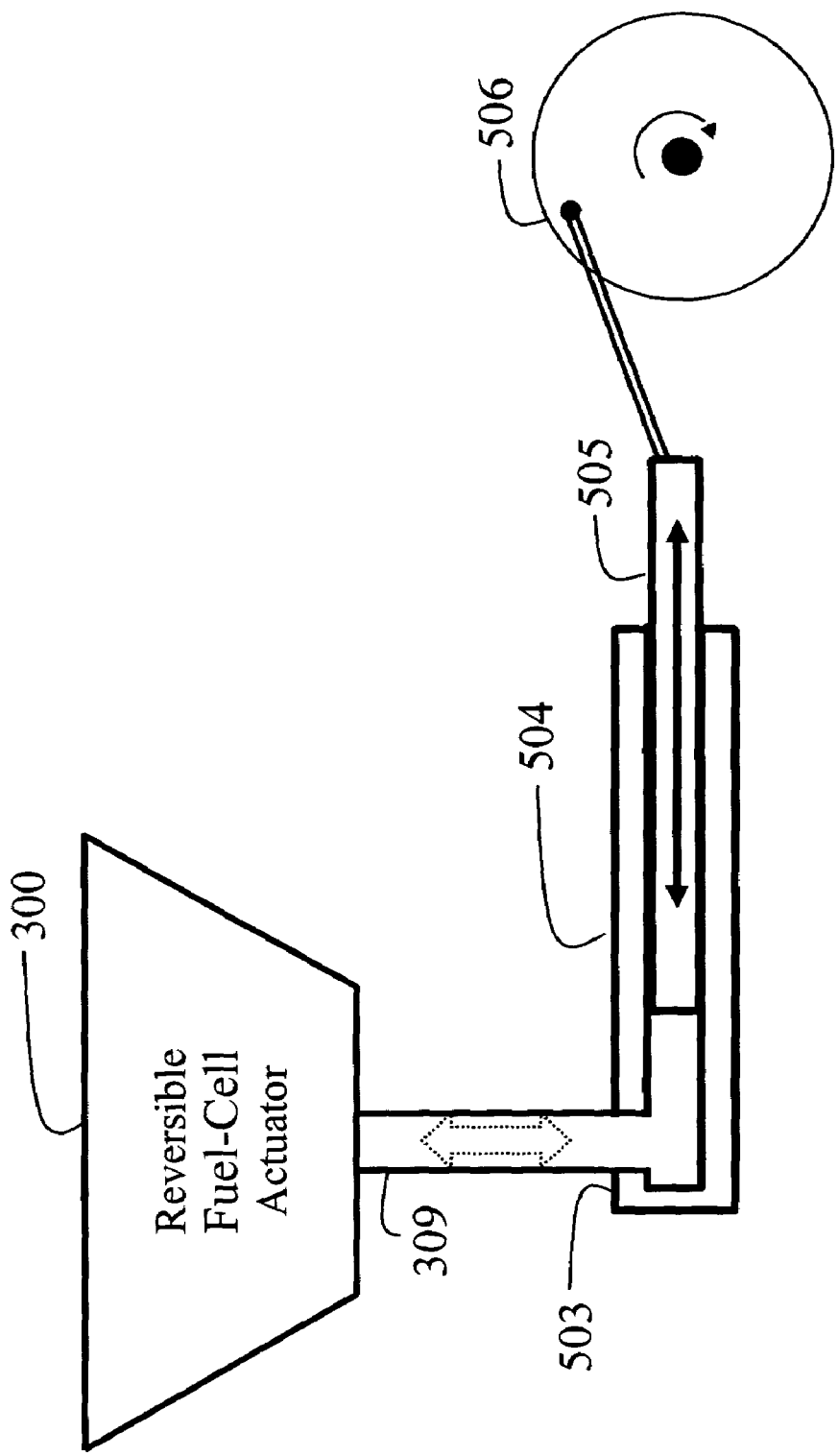
FIG. 5A is a block diagram of a reversible fuel-cell actuated mechanical energy generating device generating mechanical energy according to an embodiment of the invention.

FIG. 5A shows an alternative embodiment of the invention operating as a hydraulic ram driving a mechanical device 506. The reversible fuel-cell actuator 300 produces hydraulic pressure via the pressure delivery port 309. This pressure is led to an input port 503 of a hydraulic ram cylinder 504. Operating the actuator 300 in electrolysis mode increases the internal pressure and drives a hydraulic ram piston 505 outward, and operating the actuator 300 in fuel-cell mode decreases the internal pressure which causes the hydraulic ram piston 505 to retract.

The action of hydraulic ram piston 505 or an equivalent diaphragm actuator may be used to operate valves, sliders, latches, or any other type of mechanically actuated device, such as rotor 506.

Figure 5B:
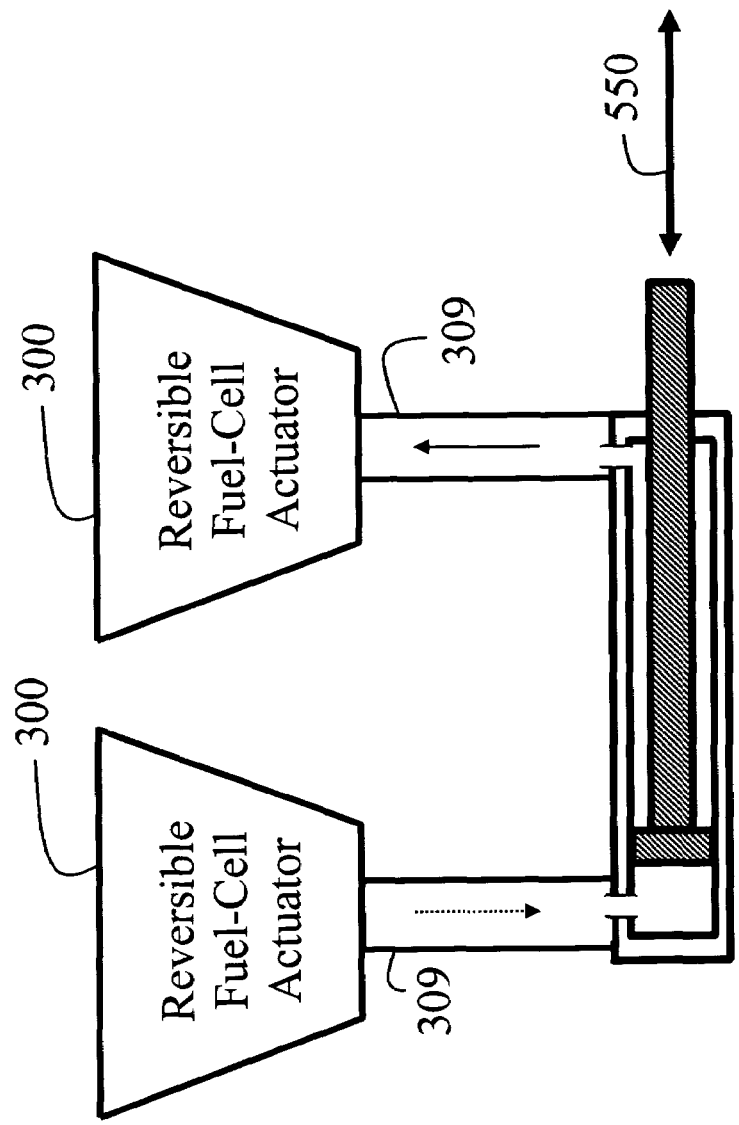
FIG. 5B is a block diagram of two reversible fuel-cell actuators generating mechanical energy according to an embodiment of the invention.

In FIG. 5B, the ram is driven 550 by two actuators 300 delivering hydraulic pressure via ports 309 in alternate repeated cycles. The stored electrical energy produced by one actuator while operating in fuel-cell mode can be used by the other actuator operating while operating in electrolysis mode.

Figure 6:
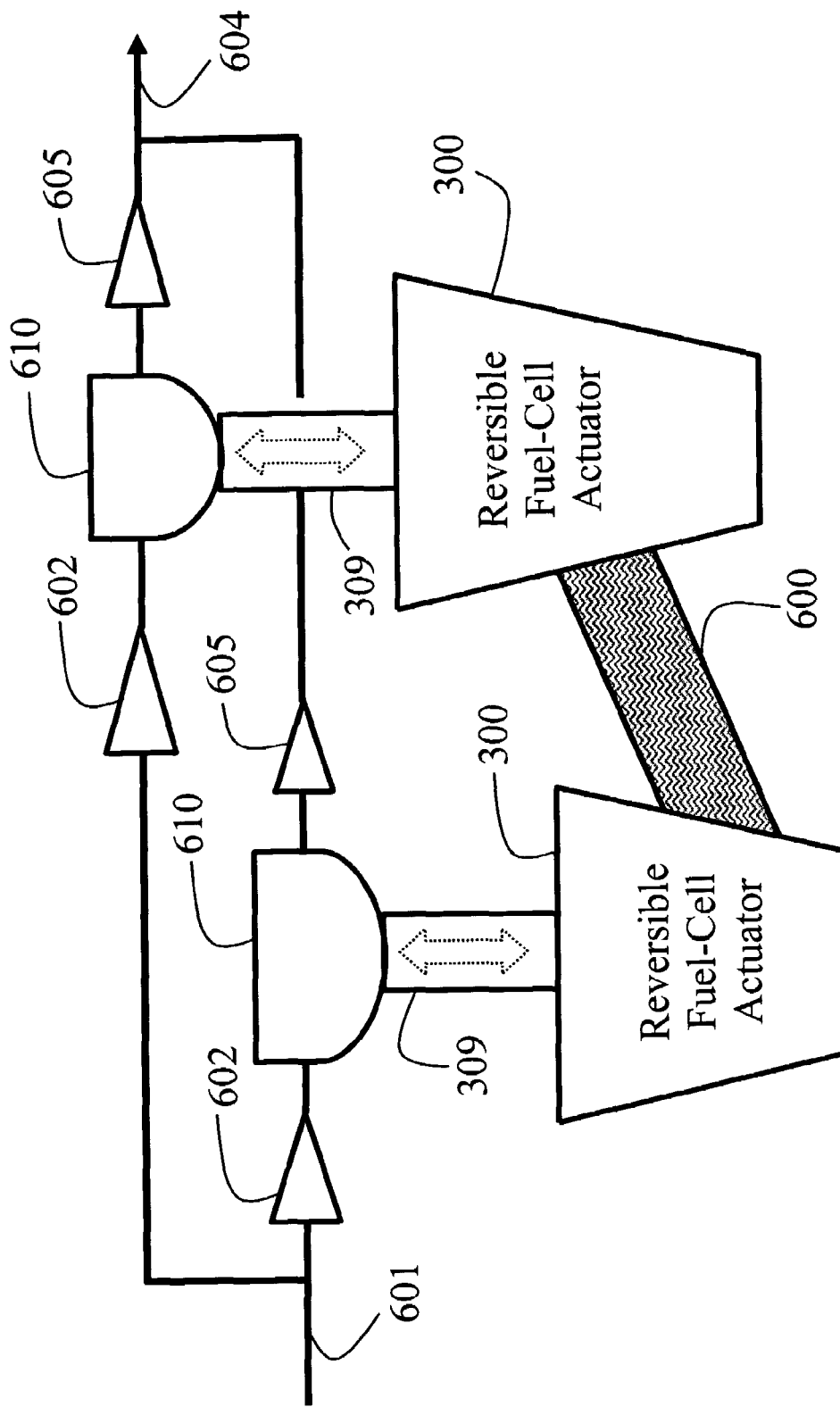
FIG. 6 is a block diagram of two reversible fuel-cell actuators pumping fluid in one direction according to an embodiment of the invention.

FIG. 6 shows a fuel-cell actuated pump according to one embodiment of the invention. The pump includes at least two reversible fuel-cell actuators 300. Pressure delivery ports 309 of each actuator are coupled to corresponding diaphragm pumps 610. Each diaphragm pump has an input tube 601, an input check valve 602, an output tube 604, and an output check valve 605, as described above. Reagent flows from left to right. An optional thermal conduction path 600 provides a way for the heat of fuel-cell operation to be transferred between the fuel-cell actuators 300, which heats the cell undergoing electrolysis during alternate cycles.

If the efficiency is 80% in the fuel-cell, and 80% of the thermal loading is reclaimed via the thermal path 600, then 80% of 10.5 KJoules/liter in the gas production phase is reclaimed, as well as 80% of 2.5 KJoules/liter thermal in the gas recombination phase. This means that the system reclaims 8.3 out of the 10.4 KJoules/liter needed to drive the system, and an overall efficiency of 2.7 KJoules/liter pumped is obtained. This is approximately 27 times the efficiency of a conventional electromechanical pump that consumes approximately 75 KJoules/liter pumped.

Directionally Controllable Pumps

Figure 7:
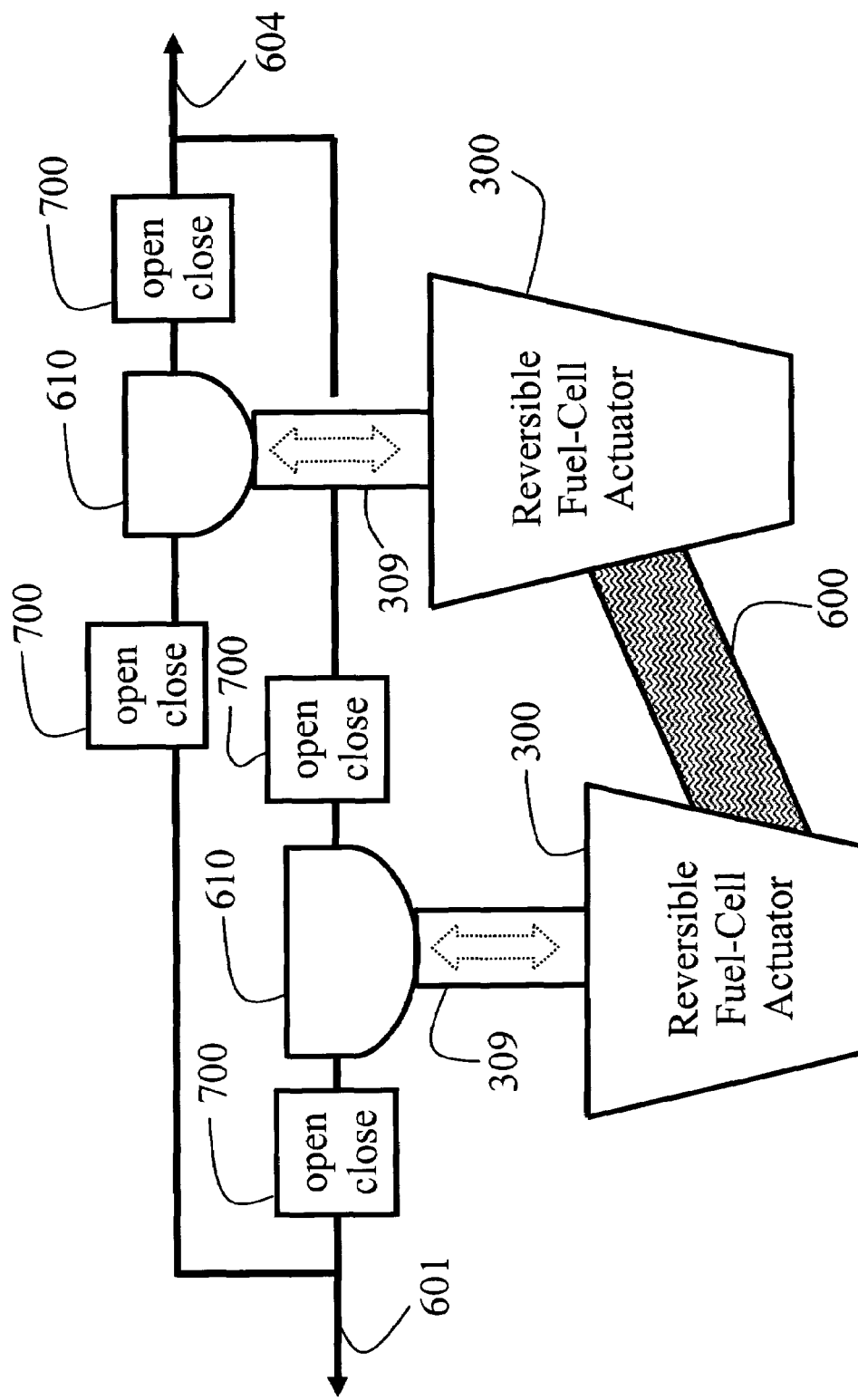
FIG. 7 is a block diagram of two reversible fuel-cell actuators pumping fluid bidirectionally according to an embodiment of the invention.

FIG. 7 shows a directionally-controlled version of the pump. In this embodiment, the check valves have been replaced by open/close valves 700. This enables the fluid to be pumped in either direction.

Arrays of Pumps

Because the energy-reclamation mode is not 100% efficient, it is preferable to avoid unnecessary acts of reclamation. Thus, double-acting actuators as shown in FIGS. 5 and 6 can be avoided by arranging the pumps and actuators in a ring, with the stored potential electric energy of each actuator being passed forward to a next actuator in the ring.

Figure 8:
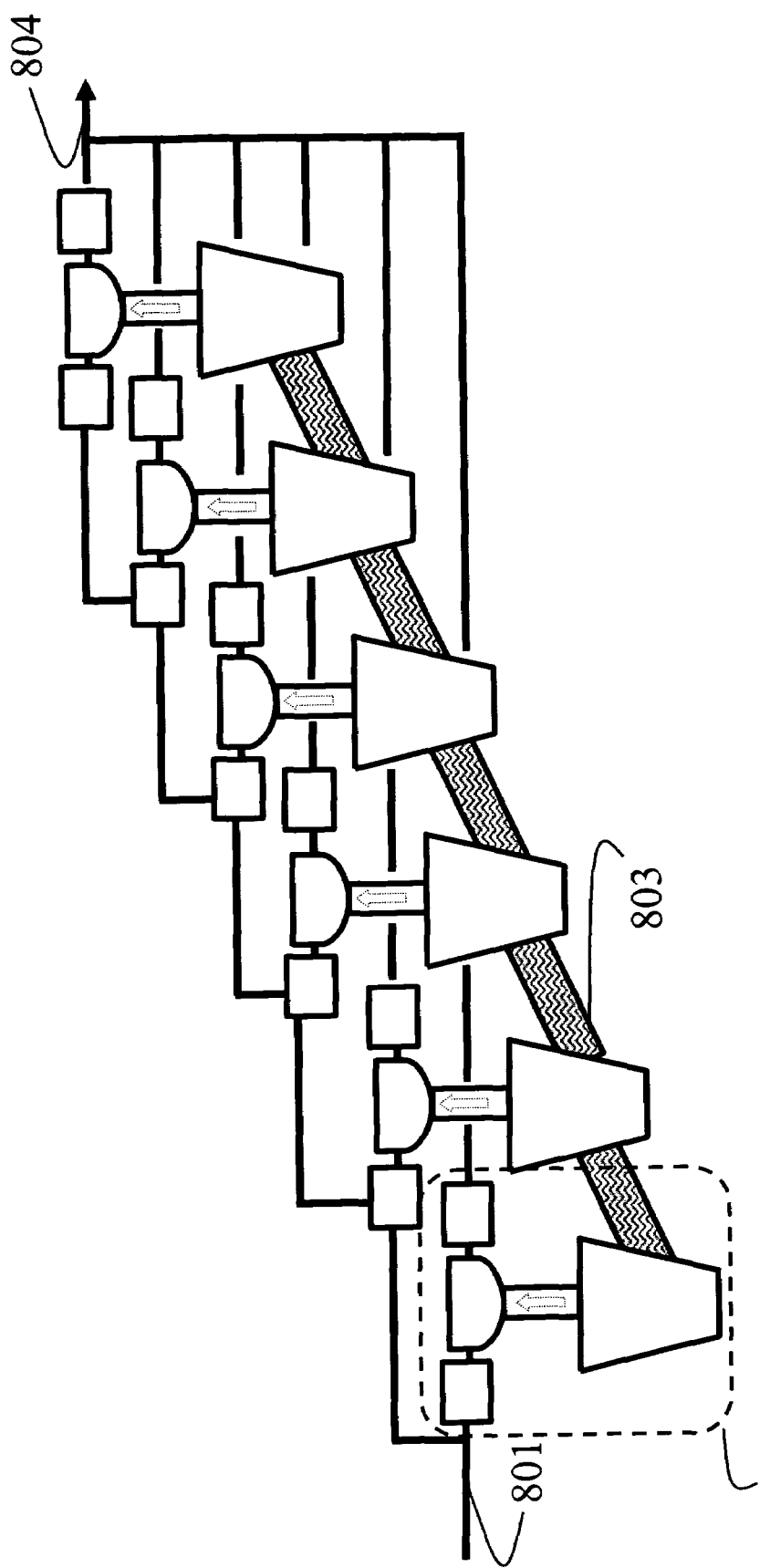
FIG. 8 is a block diagram of an array of reversible fuel-cell pumps for pumping fluid according to an embodiment of the invention.

FIG. 8 shows an array 800 of such pumps. Each pump 400 includes one fuel-cell actuator and one diaphragm pump. Additionally, each pump may be equipped either with check valves or with actuator-controlled valves.

All of the pumps 400 are connected in parallel, drawing the pumped fluid from an input port 801 and expelling pumped fluid to an output port 804. Additionally, an optional thermal conduction path 803 is provided, to minimize thermal losses due to heating during fuel-cell operation and chilling during electrolysis operation.

The pumping array is utilized by running one or more of the fuel-cell actuators, either valve actuators or diaphragm pump actuators, in fuel-cell mode, thereby obtaining electrical energy. This electrical energy, plus some additional power from an external supply, is used to drive one or more of the other actuators into electrolysis mode, producing hydrogen and oxygen gas and mechanical motion. This operation may be either on a fixed sequence of operations, or done adaptively, based on the direction and amount of pumping required.

An example fixed sequence uses six such cells in rotation as shown in Table A below. In this case, a valve is presumed closed if the associated reversible fuel-cell actuator does not contain a large volume of hydrogen, and open if the actuator does have a large volume of hydrogen. Similarly, the pump diaphragm is suctioning with low hydrogen levels, and pumping with high hydrogen levels.

TABLE A

| State | Input Valve Status | Pump Actuator Status | Output Valve Status | Electrical Energy Flow |
|---|---|---|---|---|
| start of pumping | closed | ready to pump | opening | from end of pumping |
| pumping | closed | pumping | open | from suctioning |
| end of pumping | closed | ready to suction | closing | to start of pumping |
| start of suction | opening | ready to suction | closed | from end of suctioning |
| suctioning | open | suctioning | closed | to pumping |
| end of suctioning | closing | ready to pump | closed | to start of suctioning |

This system is symmetric around this set of six pumping modules 400. For each valve opening and requiring power to drive the electrolysis reaction, a valve in the cell two steps forward is closing and generating electrical energy, via the fuel-cell reaction. Similarly, for each diaphragm pump actuator being driven into electrolysis by electrical energy to pump fluid from the diaphragm via increased pressure, another cell two steps forward is operating the pump actuator in fuel-cell mode to recombine the hydrogen and oxygen to water, creating a low-pressure area to suction more of the pumped fluid into the diaphragm cell and producing electrical energy.

Biomimectic Energy-Reclaiming Pumps

Figures 9A, 9B, 9C:
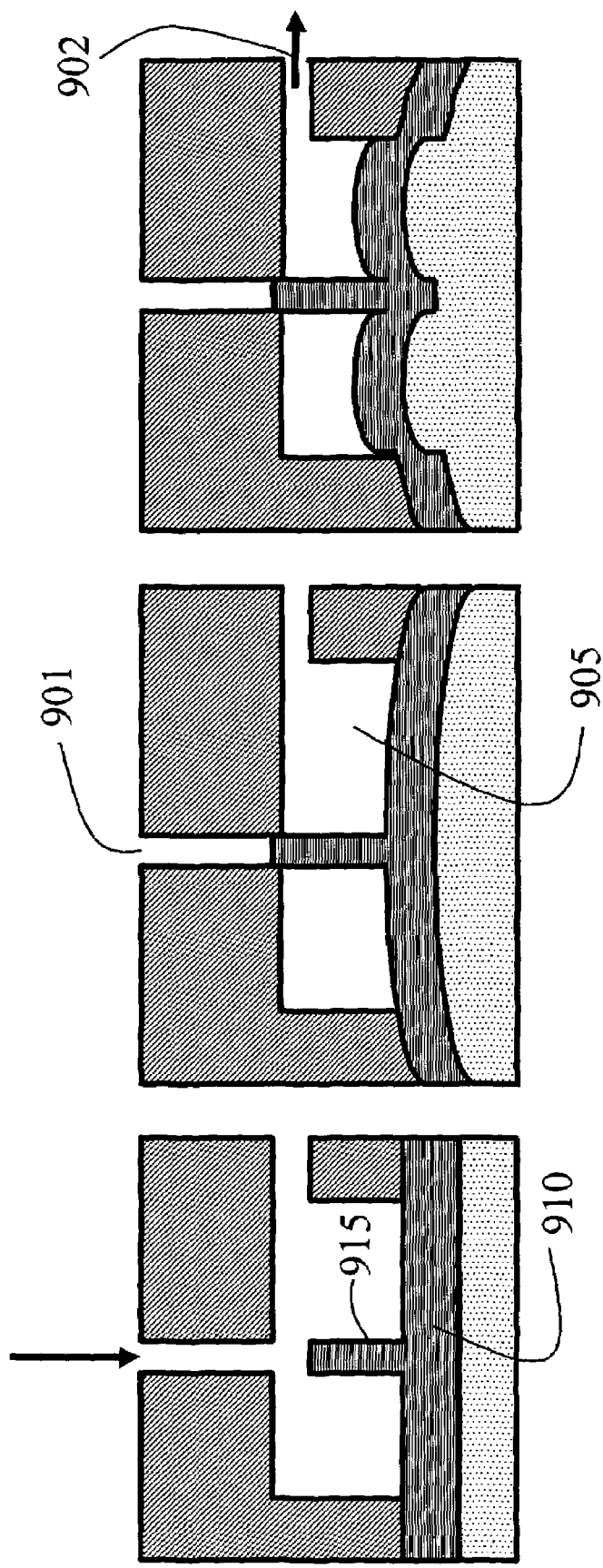
FIGS. 9A, 9B, and 9C are block diagrams of a biomimectic reversible fuel-cell actuated pump according to an embodiment of the invention.

As shown in FIGS. 9A-9C, it is also possible to use the fuel-cell actuated pump described above for a biomimectic pump. In this particular embodiment, the actuator drives both a valving action and an expulsion action, similar to the action of contracting muscle tissue in a biological pump such as the heart. This embodiment uses an elastomer for a diaphragm 910 so that both valving and pumping can be combined.

In this embodiment, the diaphragm 910 has an extension 915 that can seal an input fluid port 901 of a pumping chamber 905 early in the actuation. The remaining diaphragm motion forces fluid in the pumping chamber to flow out through the output fluid port 902, into a downstream component.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for generating mechanical energy, comprising the steps of:
   storing first water in a first fuel-cell and a first pressure equalization device;
   storing second water in a second fuel-cell and a second pressure equalization device;
   electrolyzing the first water stored in the first fuel-cell into first hydrogen gas and first oxygen gas;
   displacing the first water stored in the first pressure equalization device with the first hydrogen gas and the first oxygen gas;
   feeding the displaced first water to a hydraulic device to drive the hydraulic device in a forward direction to produce mechanical energy; and then
   recombining the first hydrogen gas and the first oxygen gas, the recombining suctioning the first water from the first pressure equalization device into the first fuel-cell to drive the hydraulic device in a backward direction to produce additional mechanical energy and potential electric energy;
   electrolyzing the second water stored in the second fuel-cell into second hydrogen gas and second oxygen gas, while recombining the first hydrogen gas and the first oxygen gas;
   displacing the second water stored in the second pressure equalization device with the second hydrogen gas and the second oxygen gas;
   feeding the displaced second water to the hydraulic device to drive the hydraulic device in the backward forward direction to produce the mechanical energy; and
   recombining the second hydrogen gas and the second oxygen, the recombining suctioning the second water from the second pressure equalization device into the second fuel-cell to drive the hydraulic device in the forward backward direction to produce additional mechanical energy potential electric energy, while electrolyzing the first water.

2. The method of claim 1, further comprising coupling the hydraulic device to a mechanical device.

3. The method of claim 1, in which the pressure equalization device includes a first chamber for storing the hydrogen gas and a second chamber for storing the oxygen gas, the first and second chambers separated by a flexible, elastic, impervious diaphragm.

4. The method of claim 1, in which the fuel-cell includes a positive electrode, a positive porous conductor, a pervious membrane, a negative porous conductor, and a negative electrode, and the pervious membrane is elastic and flexible to enable pressure equalization in the fuel-cell.

5. The method of claim 1, in which the hydraulic device is a diaphragm pump connected to an input check valve and an output check valve to pump a fluid.

6. The method of claim 1, in which the hydraulic device is a hydraulic ram.

7. The method of claim 1, in which the fuel-cell, the pressure equalization device and the hydraulic device form a closed system for storing the water.

8. The method of claim 1, in which the hydraulic device is a biomimectic pump.

9. The method of claim 1, in which electrical energy produced during the recombining is reclaimed.

10. A method for generating mechanical energy, comprising the steps of:
    storing first water in a first fuel-cell and a first pressure equalization device;
    storing second water in a second fuel-cell and a second pressure equalization device;
    electrolyzing the first water stored in the first fuel-cell into first hydrogen gas and first oxygen gas;
    displacing the first water stored in the first pressure equalization device with the first hydrogen gas and the first oxygen gas;
    feeding the displaced first water to a hydraulic device to drive the hydraulic device in a forward direction to produce mechanical energy; and then
    recombining the first hydrogen gas and the first oxygen gas, the recombining suctioning the first water from the first pressure equalization device into the first fuel-cell to drive the hydraulic device in a backward direction to produce additional mechanical energy and potential electric energy;
    electrolyzing the second water stored in the second fuel-cell into second hydrogen gas and second oxygen gas, while recombining the first hydrogen gas and the first oxygen gas;
    displacing the second water stored in the second pressure equalization device with the second hydrogen gas and the second oxygen gas:
    feeding the displaced second water to the hydraulic device to drive the hydraulic device in the backward forward direction to produce the mechanical energy; and
    recombining the second hydrogen gas and the second oxygen, the recombining suctioning the second water from the second pressure equalization device into the second fuel-cell to drive the hydraulic device in the forward backward direction on to produce additional mechanical energy potential electric energy, while electrolyzing the first water.

11. The method of claim 10, further comprising:
    connecting thermally the first fuel-cell and the second fuel-cell;
    heating the first fuel-cell while electrolyzing the first hydrogen gas and the second hydrogen gas;
    heating the second fuel-cell while electrolyzing the second hydrogen gas and the second oxygen gas.

12. A system for generating mechanical energy comprising:
    a first fuel-cell storing first water;
    a first pressure equalization device storing the first water;
    means for electrolyzing the first water stored in the first fuel-cell into first hydrogen gas and first oxygen gas to displace the first water stored in the first pressure equalization device gas;
    a hydraulic device driven in a forward direction by the displaced first water to produce mechanical energy;
    means for recombining the first hydrogen gas and the first oxygen gas, the recombining suctioning the first water from the pressure equalization device into the fuel-cell to drive, the hydraulic device in a backward direction to produce additional mechanical energy and potential electric energy;
    a second fuel-cell storing second water;
    a second pressure equalization device storing the second water;

means for electrolyzing the second water stored in the second fuel-cell into second hydrogen gas and second oxygen gas to displace the second water stored in the second pressure equalization device gas, while recombining the first hydrogen gas and the first oxygen gas, the displaced second water driving the hydraulic device in the backward; and means for recombining the second hydrogen gas and the second oxygen gas, the recombining suctioning the second water from the second equalization.

13. The system of claim 12, in which the fuel-cell, the pressure equalization device and the hydraulic device form a closed system for storing the water.

14. The system of claim 12, in which the fuel-cell further comprises:
   a positive electrode;
   a positive porous conductor;
   a pervious membrane;
   a negative porous conductor; and
   and a negative electrode.

15. The system of claim 12, in which the pressure equalization device further comprises:
   a hydrogen chamber and an oxygen chamber separated by a flexible, elastic, impervious diaphragm.

16. The system of claim 12, further comprising: a mechanical device coupled to the hydraulic device.

17. The system of claim 14, in which the pervious membrane is flexible and elastic.

18. The system of claim 12, in which the means for electrolyzing and the means for recombining steps operate alternately to produce continuous mechanical energy.

19. The system of claim 12, in which the hydraulic device is a diaphragm pump connected to an input check valve and an output check valve to pump a fluid.

20. The system of claim 12, in which the hydraulic device is a hydraulic ram.

21. The system of claim 12, in which the hydraulic device is a biomimectic pump.

22. A system for generating mechanical energy, comprising:
   a first fuel-cell storing first water;
   a first pressure equalization device storing the first water;
   means for electrolyzing the first water stored in the first fuel-cell into first hydrogen gas and first oxygen gas to displace the first water stored in the first pressure equalization device gas;
   a hydraulic device driven in a forward direction by the displaced first water to produce mechanical energy;
   means for recombining the first hydrogen gas and the first oxygen gas, the recombining suctioning the first water from the pressure equalization device into the fuel-cell to drive the hydraulic device in a backward direction to produce additional mechanical energy and potential electric energy;
   a second fuel-cell storing second water;
   a second pressure equalization device storing the second water;
   means for electrolyzing the second water stored in the second fuel-cell into second hydrogen gas and second oxygen gas to displace the second water stored in the second pressure equalization device gas, while recombining the first hydrogen gas and the first oxygen gas, the displaced second water driving the hydraulic device in the backward; and
   means for recombining the second hydrogen gas and the second oxygen gas, the recombining suctioning the second water from the second equalization to drive the hydraulic device in the forward direction to produce additional mechanical energy and potential electric energy.

23. The system of claim 22, further comprising:
   a heat conductor connected between the first fuel-cell and the second fuel-cell to heat the first fuel-cell while electrolyzing the first hydrogen gas and the second hydrogen gas and to heat the second fuel-cell while electrolyzing the second hydrogen gas and the second oxygen gas.

* * * * *